United States Patent

[11] 3,617,087

| [72] | Inventor | Takefumi Hiramatsu<br>Kitaadachi-gun, Saitama-ken, Japan |
|---|---|---|
| [21] | Appl. No. | 861,081 |
| [22] | Filed | Sept. 25, 1969 |
| [45] | Patented | Nov. 2, 1971 |
| [73] | Assignee | Honda Giken Kogyo Kabushiki Kaisha<br>Tokyo, Japan |
| [32] | Priority | Sept. 26, 1968 |
| [33] | | Japan |
| [31] | | 43/83947 |

[54] FLOOR PLATE FOR A FRAMELESS VEHICLE
4 Claims, 3 Drawing Figs.

[52] U.S. Cl. .................................................. 296/28 F, 296/63
[51] Int. Cl. ...................................................... B62d 21/10
[50] Field of Search ........................................... 296/28, 28.4 F, 63

[56] References Cited
UNITED STATES PATENTS

| 1,608,228 | 11/1926 | Parke et al. | 296/28 F UX |
| 2,271,310 | 1/1942 | Schafer | 296/28 |
| 3,002,782 | 10/1961 | Jahn | 296/28 F |
| 3,110,518 | 11/1963 | Wessells | 296/28 F |
| 3,202,451 | 8/1965 | Auger et al. | 296/28 F |
| 3,328,935 | 7/1967 | Peras | 296/28 X |
| 3,419,303 | 12/1968 | Eggert et al. | 296/28 |

FOREIGN PATENTS

| 927,275 | 5/1963 | Great Britain | 296/28 F |

*Primary Examiner*—Leo Friaglia
*Assistant Examiner*—Leslie J. Paperner
*Attorney*—Waters, Roditi, Schwartz & Nissen ABSTRACT: A floor plate is provided for a frameless vehicle. This floor plate consists of a plate having two laterally disposed inverted U-shaped channels constituting ribs. From the front of the foremost lateral rib extends a longitudinally disposed rib which is also an inverted U-shaped channel. Two further longitudinally disposed ribs extend from the rear of the first said lateral ribs, these two further ribs extending longitudinally towards the front lateral rib but short of the same. Reinforcing elements extend from the tops of said two further ribs and are connected to the front laterally disposed rib. Pillars extend upwardly from the edge of the plate and a rearward extending trunk space is also provided. Two reinforcing elements forming the base for a seat along with the aforesaid reinforcing elements are also incorporated into the floor plate.

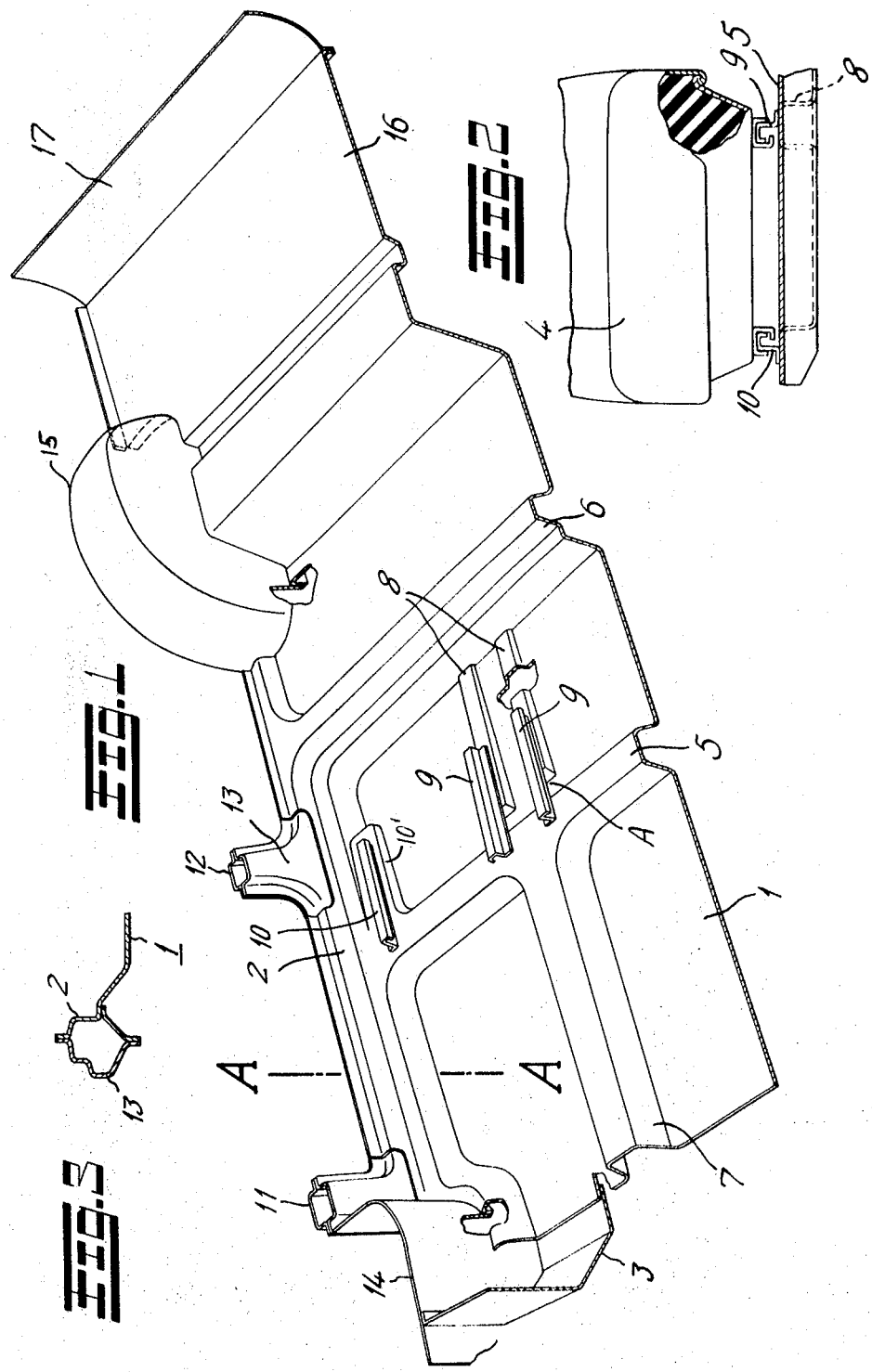

FLOOR PLATE FOR A FRAMELESS VEHICLE

SUMMARY

For a frameless vehicle, a floor plate having a front and right and left sides and a rear and including front and rear upwardly projecting lateral ribs which are spaced and parallel, a longitudinal rib projecting upwardly and extending between the front of said plate and the front lateral rib and at least one further longitudinal rib projecting upwardly and extending forward from the rear lateral rib towards but short of said front lateral rib. There is moreover provided a reinforcing member connected to said further rib as an extension thereof and to said front lateral rib.

Upturned edges may be provided at the front and right and left sides. The lateral ribs and first said longitudinal rib may be of equal height, whereas said further rib is shorter.

Pillars may be provided extending upwardly from the upturned edges and reinforcing elements may be provided on the upturned edges.

Sloped ramps may be provided extending rearwardly from the front lateral rib and base members will be provided on said ramps in parallel with the aforesaid reinforcing member.

GENERAL EXPLANATION OF DRAWING

FIG. 1 is a perspective view, partly in section, of a vehicle plate provided in accordance with one embodiment of this invention;

FIG. 2 is a front view, partly in section, showing a manner of attaching of a seat to the floor plate of FIG. 1; and FIG. 3 is a sectional view, taken along line A—A, FIG. 1.

DETAILED EXPLANATION OF INVENTION

This invention relates to a floor plate for a motorcar or vehicle of frameless construction.

An object of the invention is to provide an improved vehicle floor plate with increased rigidity.

When a floor plate for a motorcar is formed of a single steel plate, the ribs should be formed by impressing therein the form of a cross for resisting bending in the longitudinal and lateral directions. With such an arrangement, however, stress is concentrated at the intersection of the longitudinal and lateral ribs so that complete rigidity cannot be obtained.

According to this invention, a floor plate 1 is provided on its right and left sides and on its front side with upturned edges 2 and 3, respectively. Two lateral ribs 5 and 6 connected to the right and left upturned edges 2 are provided at a position corresponding to the position of the front edge of a seat 4 (FIG. 2) and behind the same, respectively. Ribs 5 and 6 project upwardly and extend in parallel with one another.

Additionally, along the longitudinal center axis of said floor plate 1 is a longitudinal rib 7 which is connected between the front side of lateral rib 5 and upturned edge 3 which is further to the front. Another longitudinal rib 8 is connected to the rearward side lateral rib 6 but is separated from the frontward lateral rib 5. Ribs 7 and 8 similarly project upwardly. An inner base member 9 is provided for attaching the seat 4 and is bridged between longitudinal rib 8 and lateral rib 5 and is secured thereto by welding. The aforesaid ribs are inverted U-shaped channels.

The longitudinal rib 8 in the illustrated example is composed of two pieces for separate inner base members 9 provided for the right and left seats 4. The base member 9 can also be a single wide member. It is desirable that the rib 8 be smaller in height than the rib 6 as illustrated.

Element 10 is an outer base member supported in parallel with member 9 on a sloped ramp 10' extending rearwardly from lateral ribs 5.

Elements 11 and 12 are base portions of pillars at the front and center of the plate. Element 13 (FIG. 3) is a reinforcing member fixed along each upturned edge 2. Elements 14 and 15 are covering plates constituting front and rear wheel housings, respectively. The rear part of the floor plate 1 may be in any desired form but, in the illustrated example, the same is formed into a higher level trunk-room floor surface 16 having at its rear end a rear surface plate 17.

The floor plate of the invention is reinforced by the peripheral upturned edges 2 and 3 and by the central longitudinal and lateral ribs 5, 6, 7 and 8. It is especially arranged to avoid the use of any cross-shaped intersection of ribs 5, 6, 7 and 8, so that any stress concentration which would otherwise be likely to occur can be avoided. Additionally, the open portion caused by the abolition of the cross-shaped intersection is bridged by the base member 9 serving for the attaching seat 4, so that this portion is fully reinforced against bending in the longitudinal direction. Thus, the plate 1 is more rigid than conventional plates wherein ribs intersect longitudinally and laterally.

What is claimed is:

1. For a frameless vehicle; a floor plate comprising a front and right and left sides and a rear including upturned edges at said front and right and left sides, a pair of upwardly projecting lateral ribs; said ribs being parallel and spaced from said front and rear edges and from each other so as to be positioned defining respectively the front support edge and the rear support edge of a seat; a first longitudinal rib projecting upwardly to a height corresponding to that of said lateral ribs and extending between the front of said plate and the front lateral rib; a further pair of spaced longitudinal ribs projecting upwardly and extending forwardly from the rear lateral rib towards but terminating short of said front lateral rib, said further longitudinal ribs being lower in height than said first longitudinal and lateral ribs; a pair of upwardly projecting sloped ramps extending rearwardly from the front lateral rib along said right and left upturned edges in parallel relation with the coplanar to said pair of further longitudinal ribs; a reinforcing member mounted on each of said further longitudinal ribs extending onto said front lateral rib; and a further reinforcing member mounted on each of said ramps in parallel, tandem-spaced relation to said first reinforcing members, said first and further reinforcing member forming cooperatively a base member for attaching a seat to said floor plate.

2. A plate as claimed in claim 1, comprising reinforcing elements on at least said right and left upturned edges.

3. A plate as claimed in claim 1, wherein each of said lateral and longitudinal ribs comprise inverted U-shaped channels in cross section.

4. A plate as claimed in claim 1, wherein at least the right and left upturned edges comprise means defining upwardly extending vehicle-supporting pillars.

* * * * *